United States Patent Office 3,589,919
Patented June 29, 1971

3,589,919
BURNED BASIC REFRACTORY AND BATCH THEREFOR
Michael A. Nelson, Jeffersonville, Ind., Robert F. Patrick, Louisville, Ky., and Thomas M. Wehrenberg, Jeffersonville, Ind., assignors to Corhart Refractories Company, Louisville, Ky.
No Drawing. Filed Apr. 21, 1969, Ser. No. 818,095
Int. Cl. C04b 35/42
U.S. Cl. 106—59                                  9 Claims

ABSTRACT OF THE DISCLOSURE

Compacted and burned refractory body made from size-graded particulate batch mixture of chemical grade (Transvaal) chromite grain with low-silica content, dead-burned magnesite grain, and fused magnesia-chemical grade chromite grain containing 53–58% MgO. Chromite grain forms 10–35% of batch as −10+150 mesh particles. Other two grains form three particle fractions: 30–60% of batch being coarse −4+20 mesh, 0–30% of batch being intermediate −10+35 mesh, and fine magnesite grain is at least 10% of batch. The total +28 mesh particles of chromite grain and magnesite grain constitute 4 to less than 50% of batch. Body burned at about 1600° C. characterized by modulus of rupture at 1340° C. consistently above 1700 p.s.i. and as high as 2000 p.s.i. or higher.

In a continuing search for better refractories to form linings and structure in furnaces employed for the modern methods of making steel and copper, and to withstand the harsher environments thereof, efforts have been directed to obtaining bricks and molded bodies of basic refractory that is ideally characterized by the combined attributes of the greatest direct bonding between the refractory crystal masses (i.e. minimal silicate or other lower melting phase as a bond between the refractory crystal masses) and highest high temperature strength together with the highest resistance to thermal shock or stress cracking as governed by lower modulus of elasticity. Heretofore, a development in the direction of this ideal was recently disclosed in U.S. Pats. 3,210,206 and 3,262,797.

According to the former patent, an essential, carefully controlled, three-component batch mixture was employed to secure a burned brick having the combination of improved thermal shock resistance with extensive direct bonding and modulus of rupture at 1260° C. consistently between about 900 and 1800 p.s.i. (resulting from a burning temperature of about 1600° C.). Two of the essential, carefully controlled components are refractory grade chrome ore, of which Philippine (Masinloc) chrome ore is the most common one, and a special fused grain analyzing between 60 and 65% MgO on an oxide basis. The third component is dead-burned magnesite or magnesia.

In the latter patent, burned bricks with a similar improved combination of properties were obtained from an essential two-component batch mixture of similar fused grain forming the entire coarse fraction of substantially +65 mesh and a second fraction all of which was −28 mesh and consisted of dead-burned magnesia and/or refractory grade chrome ore.

Despite the above noted technological advance, metal producers still have been desirous of better performance in basic refractories, which is believed to be related to the high temperature strength and particularly as measured at higher temperatures. Of course, the thermal shock and spall resistance (as well as corrosion resistance) are also important in determining the refractory life in many applications.

SUMMARY OF THE INVENTION

We have now discovered a new burned refractory body, and a batch from which to make it, that exhibits the much greater improved hot strength, because of the more extensive direct bonding between refractory crystal masses, and in combination with excellent thermal shock resistance. Such refractory body, when burned only at about 1600° C., is characterized by a modulus of rupture at 1340° C. consistently above 1700 p.s.i. and frequently as high as 2000 p.s.i. or higher. At 1260° C., its modulus of rupture is typically at about 2500 p.s.i.

This new development has come about by discarding the established industrial norm of requiring refractory grade chromite, such as Philippine (Masinloc) chromite, for producing burned basic refractories, as has continued to be the case for the unfused chromite component in the above noted patents. This norm has been based on the belief that only those coarse or massive chromites with lower iron content (about 10–13% Fe with Cr:Fe ratio of 2.2 or more) are suitable for making burned basic bricks. On the contrary, we have now been able to produce a superior burned basic refractory by employing selected portions of only the more finely divided, friable, chemical grade chromite, such as Transvaal (South African) chromite, with the higher iron content (about 18–21% Fe and Cr:Fe ratio of about 1.6), which chromite has mainly been used in the chemical industries although some of it has been used in making fused-cast refractories where all the constituents are melted together.

Furthermore, contrary to the requirement of using fused grain with over 60% MgO to provide a burned basic brick with at least equally high MgO content according to common industrial norm, our new superior product is made possible by the use of fused grain with only 53–58% MgO. Also, the fused grain in the new body is not restricted to, although essential in, the coarse fraction. Additionally, contrary to the prior art teaching of restricting the unfused constituents (dead-burned magnesite and chrome ore) to a −28 mesh fraction in burned basic bodies also containing fused magnesia-chrome grain, the superior refractory of this invention has been made by utilizing at least 4% of its unfused constituents in +28 mesh sizing.

Accordingly, the present invention is a size-graded particulate batch, and a compacted and burned refractory body composed essentially thereof, that consists essentially of—

(1) A mixture of chemical grade chromite grain containing less than 4% SiO$_2$, dead-burned magnesite or magnesia grain, and fused grain composed essentially of a melted and resolidified mixture of chemical grade chromite and dead-burned magnesite or magnesia, which fused grain analyzes 53–58% MgO on an oxide basis.

(2) 10–35% (preferably at least 15% and not more than 25%) being a chromite fraction whose particles are substantially all −10+150 mesh and composed of the chromite grain, (3) 30–60% (preferably 35–45%) being a coarse fraction whose particles are substantially all −4+20 mesh and composed of, with percentages based on whole batch, 20–60% the fused grain and 0–40% the magnesite grain, (4) 0–30% (preferably 10–20%) being an intermediate fraction whose particles are substantially all −10+35 mesh and composed of the fused grain and/or the magnesite grain, (5) 25–60% (preferably 25–35%) being a fine fraction whose particles are −35 mesh and composed of, based on whole batch, 10–40% magnesite grain and 0–50% fused grain, and (6) 4 (preferably 8) to less than 50% being +28 mesh particles of chromite grain and/or magnesite grain.

The more usual chemical grade chromite is Transvaal chromite, which is preferred. A typical range of analysis of such chromite is: 44.7–46.0% $Cr_2O_3$, 19.7–25.6% $FeO+Fe_2O_3$, 14.2–15.3% $Al_2O_3$, 10.0–11.4% $MgO$, 0.2–0.4% $CaO$ and 0.7–3.8% $SiO_2$.

Any relatively high purity dead-burned or highly calcined magnesite or magnesia can be used. ("Magnesite" and "magnesia" are used synonymously herein as is common in the industry.) A typical range of analysis of one suitable dead-burned magnesite is: 94.0–96.5% $MgO$, 0.8–1.3% $CaO$, 1.3–2.4% $SiO_2$, 0.3–0.6% $Al_2O_3$, 0.3–0.8% $FeO$ and trace of $Cr_2O_3$.

A typical range of analysis of one fused grain, obtained by crushing electrically melted, fusion-cast blocks, according to this invention is: 53–58% $MgO$, 17–22% $Cr_2O_3$, 5–10% $Al_2O_3$, up to 14% $FeO$, up to 3% $SiO_2$, up to 1% $CaO$, up to 1% fluorine and up to 2% $TiO_2$.

In an especially beneficial form, the batch fractions are more particularly characterized as follows:

(a) The chromite fraction is 0–45% +28 mesh particles and 60–95% +65 mesh particles, (b) The coarse fraction is 73–89% +10 mesh particles, (c) The intermediate fraction is 70–86% +28 mesh particles, and (d) The fine fraction is 0–10% +65 mesh particles, 8–23% +150 mesh particles and 27–43% +325 mesh particles.

In preparing a batch for fabricating bricks or other bodies, the appropriately size-graded and proportioned grain constituents for each fraction are mixed together for about 5–10 minutes with tempering fluid, according to any suitable or conventional procedure. Preferably, the solids, except the fine fraction, are first dry mixed for a minute or so. For pressing bricks, the tempering fluid can include lubricant and binder, such as a 10–33.3% water solution of waxy polyethylene glycol in an amount up to about 3% of the batch solids and a 50% water solution of lignin sulfite in an amount of about 0.25–3% of the batch solids. If the compacted green body is to be burned in service, the tempering fluid can be common aqueous sodium silicate solution with about 0.25–5% glycerin or ethylene glycol added as humectant to prevent drying cracks and a small amount of a common wetting agent that will reduce the amount of silicate required. The moldable batch is then formed by the usual techniques of mechanical pressing, hand ramming and the like. For mechanical pressing of the more common furnace bricks ranging from 9″ straight brick to 18″ large brick, 400 to 800 tons press pressure is usual and adequate. After the green bodies are compacted to shape, they may be dried if desired to increase their green handling strength. Thereafter, they are burned at about 1600° C. (or at least 1565° C. and up to about 1650° C.) for at least about six hours, whereupon a very high degree of direct bonding and the improved strength are effected in the burned products. They are also characterized by quite low apparent porosity (about 15% or less) and good thermal shock resistance (as indicated by relatively low modulus of elasticity).

DESCRIPTION OF THE PREFERRED EMBODIMENTS

EXAMPLE 1

A variety of commercial furnace size bricks were mechanically pressed from a tempered batch made from the following constituents:

| | Percent |
|---|---|
| Chromite fraction, transvaal chromite grain | 20 |
| Coarse fraction, fused grain | 40 |
| Intermediate fraction: | |
|   Fused grain | 5 |
|   Dead-burned magnesite | 10 |
| Fine fraction, dead-burned magnesite | 25 |

Each of these fractions of grain particles was size-graded so as to have the following cumulative percentages (maximum, minimum, and typical) of the whole fraction left on each of the several mesh size screens:

(A) CHROMITE FRACTION

| Mesh | Maximum | Minimum | Typical |
|---|---|---|---|
| 10 | 0 | 0 | 0 |
| 28 | 45 | 0 | 15 |
| 35 | 70 | 20 | 35 |
| 48 | 85 | 40 | 53 |
| 65 | 95 | 60 | 78 |
| 150 | 100 | 80 | 96 |

(B) COARSE FRACTION

| Mesh | Maximum | Minimum | Typical |
|---|---|---|---|
| 4 | 0 | 0 | 0 |
| 6 | 21 | 1 | 10 |
| 8 | 57 | 39 | 48 |
| 10 | 89 | 78 | 78 |
| 12 | 100 | 85 | 92 |
| 20 | 100 | 94 | 97 |

(C) INTERMEDIATE FRACTION

| Mesh | Maximum | Minimum | Typical |
|---|---|---|---|
| 10 | 0 | 0 | 0 |
| 14 | 21 | 3 | 9 |
| 20 | 61 | 43 | 52 |
| 28 | 86 | 70 | 78 |
| 35 | 100 | 85 | 92 |

(D) FINE FRACTION

| Mesh | Maximum | Minimum | Typical |
|---|---|---|---|
| 35 | 0 | 0 | 0 |
| 65 | 10 | 0 | 5 |
| 100 | 15 | 0 | 8 |
| 150 | 23 | 8 | 15 |
| 200 | 30 | 15 | 22 |
| 250 | 33 | 18 | 26 |
| 325 | 43 | 27 | 35 |

Typical analyses of the three materials from which these constituents were formed as as follows:

Transvaal chromite—46.0% $Cr_2O_3$, 24.9%

$FeO+Fe_2O_3$ 15.2% $Al_2O_3$, 11.3% $MgO$, 0.3% $CaO$, and 2.3% $SiO_2$,

Fused grain—55–56% $MgO$, 20% $Cr_2O_3$, 8% $Al_2O_3$, 11% $FeO$, 2.5% $SiO_2$, 0.5% $CaO$, 0.3% F, and 1.5% $TiO_2$, and Dead-burned magnesite—95.8% $MgO$, 1.0% $CaO$, 1.8% $SiO_2$, 0.4% $Al_2O_3$, 0.6% $Fe_2O_3$, and 0.5% $Cr_2O_3$.

After the pressed green bricks were dried, they were burned at about 1600° C. for at least six hours, whereupon extensive direct bonding was developed between the refractory crystals of periclase and chrome spinel. Average modulus of rupture at 1340° C. of these bricks was about 1850 p.s.i. with a prevailing range of variation between 1700–2000 p.s.i. A series of 1″ x 1″ x 3″ thermal shock test pieces of these bricks underwent 20 cycles without any spalling failure in the severe test wherein one cycle involves placing a test piece at room temperature into a furnace preheated to 1400° C., holding the test piece in the furnace for 10 minutes, and then removing it from the furnace and placing it on a steel plate for 10 minutes in ambient atmosphere at room temperature.

By way of comparison, other commercial competitive burned basic bricks are inferior. For example, commercial bricks made according to U.S. Pat. 3,384,500 have an average modulus of rupture at 1340° C. of only 1400–1500 p.s.i. and average only 12 cycles in the thermal shock test at the time of spalling failure. Other leading commercial basic brick made generally of 60% dead-burned magnesite and 40% refractory grade chromite, and burned at about 1725° C., exhibit a typical modulus of rupture at 1340° C. of only 1000–1400 p.s.i. and average only 14 cycles in the thermal shock test at the time of spalling failure.

EXAMPLE 2

Using the same size-grading and materials as in the preceding example, commercial furnace size bricks were mechanically pressed from a tempered batch formulated as follows:

| | Percent |
|---|---|
| Chromite fraction, Transvaal chromite grain | 20 |
| Coarse fraction, fused grain | 40 |
| Intermediate fraction: | |
|   Fused grain | 10 |
|   Dead-burned magnesite | 5 |
| Fine fraction, dead-burned magnesite | 25 |

After being burned at about 1600° C., the highly direct bonded products exhibited typical modulus of rupture of 1750 p.s.i. at 1340° C. and withstood 20 cycles of the thermal shock test without spalling failure.

EXAMPLE 3

Again using the same size-grading and raw materials as in the preceding examples, bricks were mechanically pressed from a tempered batch of the following formulation:

| | Percent |
|---|---|
| Chromite fraction, Transvaal chromite grain | 20 |
| Coarse fraction, fused grain | 35 |
| Intermediate fraction: | |
|   Fused grain | 5 |
|   Dead-burned magnesite | 5 |
| Fine fraction: | |
|   Dead-burned magnesite | 25 |
|   Fused grain | 10 |

The direct bonded products resulting after burning at about 1600° C. were found to have a typical modulus of rupture at 1340° C. of 1750 p.s.i. and to withstand 20 cycles of the thermal shock test without spalling failure.

EXAMPLE 4

Burned bricks with properties comparable to the first two examples can be formed from the following batch formulation with the size-grading, raw materials and burning temperature being as in the preceding examples:

| | Percent |
|---|---|
| Chromite fraction, Transvaal chromite grain | 26 |
| Coarse fraction, fused grain | 30 |
| Intermediate fraction, dead-burned magnesite | 10 |
| Fine fraction: | |
|   Dead-burned magnesite | 29 |
|   Fused grain | 5 |

As noted previously these batch formulations can also be employed as ramming mixes to form bodies that are burned in service.

In the foregoing specification, all mesh sizes are according to the Tyler series and all percentages are on a weight basis.

We claim:

1. A size-graded particulate batch for the production of refractory bodies consisting essentially of, with percentages on weight basis,
   a mixture of chemical grade chromite grain containing less than 4% $SiO_2$, dead-burned magnesite grain, and fused grain composed essentially of a melted and resolidified mixture of chemical grade chromite and dead-burned magnesite, said fused grain analyzing 53 to 58% MgO on an oxide basis,
   10 to 35% being a chromite fraction whose particles are substantially all $-10+150$ mesh (Tyler) and composed of said chromite grain,
   30 to 60% being a coarse fraction whose particles are substantially all $-4+20$ mesh (Tyler) and composed of, with percentages based on whole batch, 20 to 60% said fused grain and 0 to 40% said magnesite grain,
   0 to 30% being an intermediate fraction whose particles are substantially all $-10+35$ mesh (Tyler) and composed of at least one of said fused grain and said magnesite grain,
   25 to 60% being a fine fraction whose particles are $-35$ mesh (Tyler) and composed of, based on whole batch, 10 to 40% said magnesite grain and 0 to 50% said fused grain, and
   4 to less than 50% being $+28$ mesh (Tyler) particles of at least one of said chromite grain and said magnesite grain.

2. The batch of claim 1 wherein said chemical grade chromite is Transvaal chromite.

3. The batch of claim 1 wherein
   said chromite fraction is 0 to 45% $+28$ mesh (Tyler) particles and 60 to 95% $+65$ mesh (Tyler) particles,
   said coarse fraction is 73 to 89% $+10$ mesh (Tyler) particles,
   said intermediate fraction is 70 to 86% $+28$ mesh (Tyler) particles, and
   said fine fraction is 0 to 10% $+65$ mesh (Tyler) particles, 8 to 23% $+150$ mesh (Tyler) particles and 27 to 43% $+325$ mesh (Tyler) particles.

4. The batch of claim 3 wherein said chromite fraction constitutes at least 15% of said batch.

5. The batch of claim 3 wherein said $+28$ mesh (Tyler) particles constitute at least 8% of said batch.

6. The batch of claim 5 wherein
   said chemical grade chromite is Transvaal chromite,
   said chromite fraction constitutes 15 to 25% of said batch,
   said coarse fraction constitutes 35 to 45% of said batch,
   said intermediate fraction constitutes 10 to 20% of said batch, and
   said fine fraction constitutes 25 to 35% of said batch.

7. A compacted and burned refractory body composed essentially of the batch of claim 1.

8. A compacted and burned refractory body composed essentially of the batch of claim 3.

9. A compacted and burned refractory body composed essentially of the batch of claim 6.

References Cited

UNITED STATES PATENTS

| 3,210,206 | 10/1965 | Davies et al. | 106—59 |
| 3,262,797 | 7/1966 | Davies | 106—59 |
| 3,384,500 | 5/1968 | Patrick et al. | 106—59 |
| 3,403,213 | 9/1968 | Taylor et al. | 106—59 |

JAMES E. POER, Primary Examiner